United States Patent [19]

Utsunomiya et al.

[11] 4,442,371
[45] Apr. 10, 1984

[54] COOLING DEVICE FOR ROTARY ELECTRIC MACHINE

[75] Inventors: Yumiteru Utsunomiya, Isahaya; Shigeru Murayama, Nagasaki, both of Japan

[73] Assignee: Mitsubishi Denki Kabushiki Kaisha, Tokyo, Japan

[21] Appl. No.: 436,652

[22] Filed: Oct. 25, 1982

[30] Foreign Application Priority Data

Nov. 24, 1981 [JP] Japan ............................ 56-188589

[51] Int. Cl.³ .............................................. H02K 3/46
[52] U.S. Cl. ..................................... 310/260; 310/45; 310/58; 310/65
[58] Field of Search ............... 310/260, 53, 58, 57, 310/59, 60 R, 62, 63, 64, 65, 45, 52

[56] References Cited

U.S. PATENT DOCUMENTS 3,435,517  4/1969  Fortenbach ......................... 310/260
4,324,993  4/1982  Sato ..................................... 310/260

FOREIGN PATENT DOCUMENTS 134707  3/1979  Fed. Rep. of Germany ...... 310/260
55-147941  11/1980  Japan.
494822  11/1973  U.S.S.R. .............................. 310/260

*Primary Examiner*—R. Skudy
*Attorney, Agent, or Firm*—Leydig, Voit, Osann, Mayer and Holt, Ltd.

[57] ABSTRACT

The present invention improves the construction of a cooling ventilation flue for the coil end portion of the stator of a rotary electric machine so as to enhance the cooling effect. That is, the invention provides a cooling device for a rotary electric machine characterized by comprising a ventilation guide which is disposed at the coil end portion of the stator of the rotary electric machine, which divides the stator coil end portion in an axial direction of the rotor of the rotary electric machine into a first ventilating section for advancing cooling air onto an inner peripheral side of the coil end portion and a second ventilating section for advancing the cooling air, having passed through the first ventilating section, onto an outer peripheral side of the coil end portion and which guides the cooling air, having passed through the second ventilating section, into a space surrounding the stator.

4 Claims, 9 Drawing Figures

COOLING DEVICE FOR ROTARY ELECTRIC MACHINE

BACKGROUND OF THE INVENTION

This invention relates to a cooling device for a rotary electric machine, and more particularly to the ventilation of a stator coil end portion.

A prior-art cooling device for a rotary electric machine of the pertinent type has been as shown in FIG. 1. Referring to the figure, numeral 1 designates a frame which has a plurality of side plates 1a, numeral 2 a stator core, numerals 3 and 4 ventilating ducts of the stator core, and numeral 5 a stator clamper which serves to hold the stator core 2 in a sandwiched fashion and in which a plurality of ventilating holes 5a are provided at equal intervals in the circumferential direction thereof. Numeral 6 indicates that end portion of a stator coil which protrudes from the stator core 2, and numeral 7 a ventilation guide which covers the stator coil end portion 6 and which is constructed of a shroud 8 and a wind receiver 9 to be described next. The shroud 8 is mounted on the stator clamper 5, while the wind receiver 9 is fixed to the shroud 8 by bolts. Numeral 10 indicates a breath ring which is mounted on the stator coil end portion 6, numeral 11 a supporting arm which holds the breath ring 10 on the stator clamper 5, numeral 12 a bracket cover which is detachably mounted on an axial end part of the frame 1, numeral 13 a rotary shaft, numeral 14 a rotor core, numeral 15 a ventilating duct of the rotor core, numeral 16 an axial fan, numeral 17 an air inlet which is opened in the upper part of the frame 1, numeral 18 an air outlet which is opened in the upper part of the frame 1 over the stator core 2, and numeral 19 an air intake passage which is formed between the ventilation guide 7 and the bracket cover 12. Letters A denote spacers which are interposed between top coils or bottom coils in the stator coil end portion 6, while letter B denotes a connecting lead for, e. g., the poles of the stator coil.

The supporting arm 11 is mounted on the stator clamper 5, and the end portion 6 of the stator coil is supported by the breath ring 10 fixed to the supporting arm 11. The frame 1 is open on the side over the shroud 8 and the side over the stator core 2, and the open sides form the air inlet 17 and the air outlet 18 respectively.

Cooling air drawn by suction through the air inlet 17 by means of the axial fan 16 passes via the air intake passage 19 outside the ventilation guide 7 and then centrifugally through the interspaces between the wind receiver 9 and the stator coil end portion 6 and between the coils of the stator coil end portion 6, as indicated by arrows. Further, it is sent on to the outer peripheral side of the stator core 2 through the ventilating holes 5a of the stator clamper 5 and the ventilating duct 4 at the end part of the stator core 2, whereupon it is emitted from the air outlet 18. In addition, part of the cooling air drawn by suction passes from the inner periphery of the rotor core 14 via the ventilating ducts 15, 3 of the cores to the outer periphery of the stator core 2, from which it is emitted to the exterior.

Since the prior-art rotary electric machine is constructed as described above, the interspace between the coils of the stator coil end portion is narrow whereas the wind receiver and the stator coil end portion are widely spaced. Therefore, the greater part of the cooling air passes through the interspace between the wind receiver and the stator coil end portion, and a sufficient quantity of ventilation cannot be secured through the interspace between the coils, so that the cooling of the stator coils is not performed effectively.

SUMMARY OF THE INVENTION

The present invention improves the ventilating structure of the prior-art cooling device described above, and has for its object to enhance the cooling effect by a construction wherein a ventilation flue in a stator coil end portion is divided by a ventilation guide and wherein the respective divided parts of the stator coil end portion are situated in a circulating ventilation flue.

BRIEF DESCRIPTION OF THE DRAWINGS

In the drawings, the same symbols indicate the same or corresponding parts.

DESCRIPTION OF THE PREFERRED EMBODIMENTS

Figure 3:
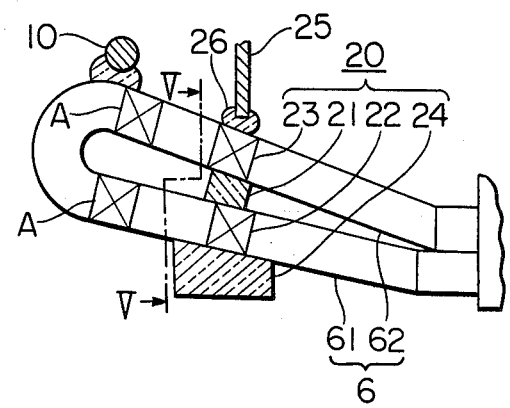
FIG. 3 is a sectional view showing the details of the stator coil end portion in FIG. 2.
Figure 4:
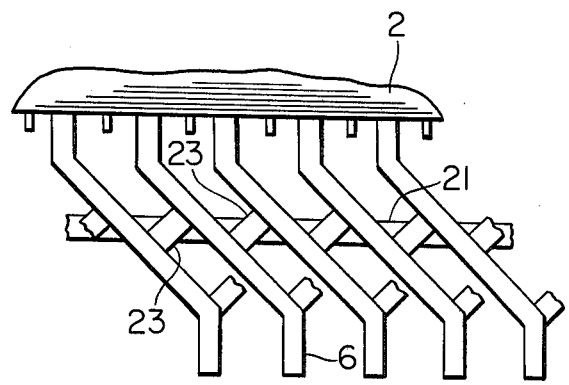
FIG. 4 is a sectional view taken along line IV—IV in FIG. 2.
Figure 5:
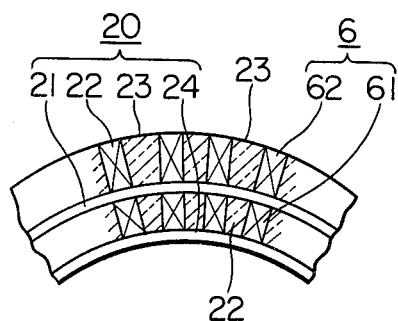
FIG. 5 is a sectional view taken along line V—V in FIG. 3.
Figure 6:
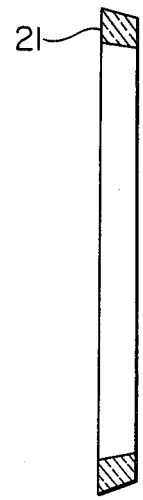
FIG. 6 is a sectional view showing the hardened state of a spacer ring which is an embodiment of this invention.
Figure 7:
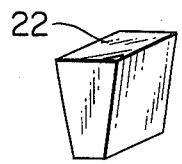
FIG. 7 is a perspective view showing the hardened state of a spacer which is an embodiment of this invention.

An embodiment of this invention will now be described with reference to the drawings. In FIGS. 2 to 7, numeral 30 designates a ventilation guide which covers about half of the outer periphery of a stator coil end portion 6 and which is constructed of a shroud 25 and a partition member 20. The partition member 20 is arranged substantially in the radial direction in the intermediate part of the stator coil end portion 6 as illustrated in FIG. 3, and is constructed of the following components 21 to 24. The component 21 is a spacer ring which is formed in the shape of a circular annulus as shown in FIG. 6. As illustrated in FIGS. 3 to 5, it is interposed between top coils 61 and bottom coils 62 in a manner to extend in the circumferential direction. The component 22 is a spacer which is formed in a wedge shape as shown in FIG. 7, and it is interposed between the top coils 61 as illustrated in FIGS. 3 and 5. The component 23 is a spacer similar to the spacer 22, and is interposed between the bottom coils 62. The component 24 is a deflecting ring in the shape of a circular annulus which is fastened on the inner peripheral side of the top coils 61 in a manner to contact the spacers 22.

Figure 2:
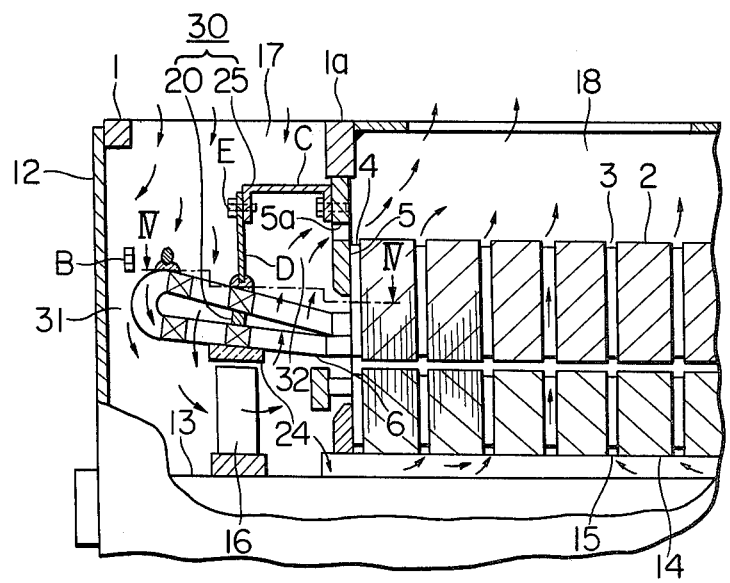
FIG. 2 is a vertical sectional view showing the essential portions of a cooling device for a rotary electric machine embodying this invention.

The aforementioned shroud 25 has its axial dimension shortened in comparison with the shroud in the prior art, and it includes two members C and D which are clamped by a bolt E as illustrated in FIG. 2. The partition member 20 and the shroud 25 mentioned above constitute the ventilation guide 30 which covers a part of the stator coil end portion 6. An inward air intake passage or first ventilation section 31 extending in the radial direction, is formed outside this ventilation guide 30, that is, between the ventilation guide 30 and a bracket cover 12, while an outward passage or second ventilation flue or section 32 extending in the radial direction is formed between the ventilation guide 30 and a stator core 2. Shown at numeral 26 is a filler, such as felt, which is packed in order to fill up the clearance between the shroud 25 and the outer periphery of the stator coil end portion 6.

Now, a method of fabricating the above-stated ventilation guide 30 will be explained. A porous, pliable material having an insulating property, such as felt, is inserted so as to make a ring between the top coils 61 and the bottom coils 62 to form the spacer ring 21. The spacers 22, of predetermined width also made of felt or a like porous pliable material, are inserted between the top coils 61 in a manner to adjoin the spacer ring 21, and the similar spacers 23 are inserted between the bottom coils 62, thereby to close up the interspaces between the coils. Further, the deflecting ring 24 whose outer periphery is tapered and whose inside diameter is made somewhat larger than the outside diameter of the axial fan 16, is mounted on the inner periphery of the top coils 61 and in positions contacting the spacers 22, by cords or the like. Thus, the partition member 20 consisting of from the spacer ring 21 to the deflecting ring 24 is formed.

In the next place, the filler 26 a porous material such as felt is packed between the inner periphery of the shroud 25 and the bottom coils 62 so as to close up the clearance therebetween. Further, when the respective porous materials, such as felt, constituting the stator coil partition member 20 are impregnated with an insulating varnish made of a thermosetting resin such as epoxy resin and the insulating varnish is hardened, the stator coil end portion 6 is firmly held by the hardened partition member 20. Thus, the ventilation guide 30 is formed of the partition member 20 and the shroud 25. Owing to this ventilation guide 30, the air intake passage 31 extending from the air inlet 17 of the frame 1 is formed on the outer side, and the ventilation flue 32 extending toward the outer periphery is formed on the inner side.

Now, the action of ventilation will be described with reference to FIG. 2. The cooling air, which has been drawn by suction from the air inlet 17 by means of the axial fan 16, passes through the air intake passage 31 outside the ventilation guide 30 as indicated by arrows in FIG. 2 and cools the part of the stator coil end portion 6 facing the air intake passage 31. Subsequently, part of the cooling air which is sent into the ventilation flue 32 inside the ventilation guide 30 by means of the axial fan 16 cools the respective coils of the stator coil end portion 6 when passing through the interspaces between these coils in the centrifugal direction, whereupon it passes through the ventilating holes 5a of the stator clamper 5 and is emitted out of the air outlet 18 in the upper part at the rear of the stator core 2. Part of the cooling air drawn by suction passes through the ventilating ducts 15, 3 and is emitted out of the air outlet 18 in the same manner as in the prior art.

In this manner, the ventilation space containing the stator coil end portion 6 is divided into two sections by the ventilation guide 30, and the coil end portion is ventilated twice in the centripetal and centrifugal directions, thereby to raise the passing speed of the cooling air, and moreover, all the cooling air introduced between the partition member 20 and the stator core 2 passes through the interspaces between the coils, so that the cooling effect at the stator coil is enhanced. Further, since the tail end part of the stator coil end portion 6 faces the air intake passage 31, it is cooled by the suction air at a low temperature, and the cooling effect thereof is remarkably improved over that in the prior art.

Figure 1:
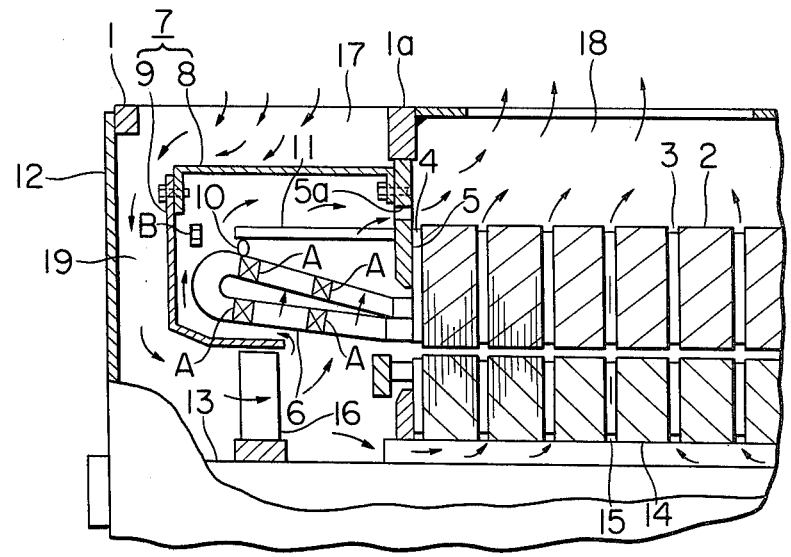
FIG. 1 is a vertical sectional view showing the essential portions of a prior-art cooling device for a rotary electric machine.

As compared with that in the prior art, the stator coil end portion 6 has its rigidity enhanced because the top coils 61 are also held by the partition member 20. Further, the connecting leads of the stator coils, phase connecting leads, etc. can be arranged outside the partition member 20, namely, between the partition member 20 and the bracket cover 12, so that the connections can be readily inspected and repaired as soon as the bracket cover 12 is removed. In addition, as understood by comparing FIG. 1 and FIG. 2, the embodiment has, in comparison with the prior-art device, the advantage that even when the lengths of the stator coil end portion 6 are equal between the two, the axial length of the frame 1 is shortened by a component which corresponds substantially to the air intake passage 19 in the prior-art device.

Figure 8:
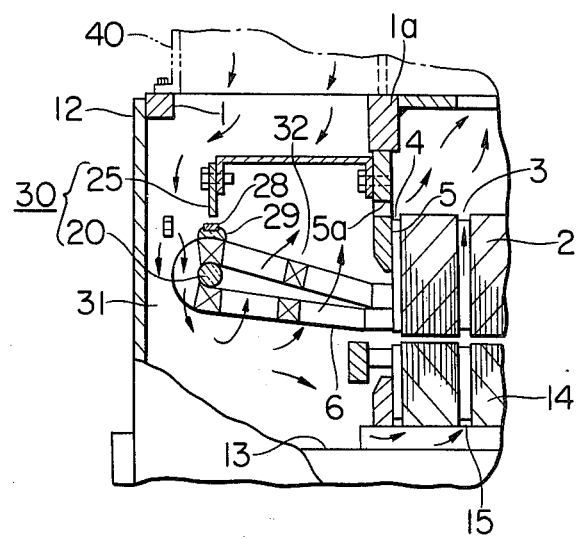
FIG. 8 is a vertical sectional view showing the essential portions of a cooling device for a rotary electric machine in another embodiment of this invention.
Figure 9:
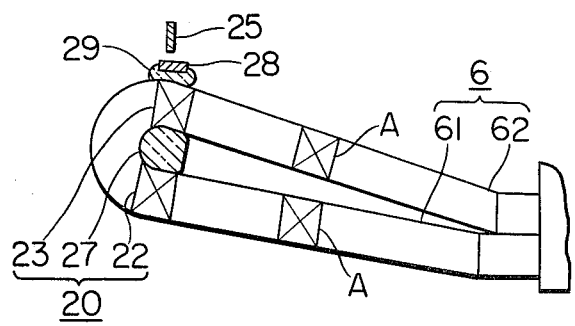
FIG. 9 is a sectional view showing the details of a stator coil end portion in FIG. 8.

Now, another embodiment of this invention will be described with reference to FIGS. 8 and 9. In the figures, numerals 22 and 23 designate spacers which are inserted between respective top coils 61 and bottom coils 62 in the nose part of a stator coil end portion 6. Numeral 27 designates a spacer ring made of felt or the like, which is inserted in the nose part in a manner to make a ring. The spacers 22, 23 and the spacer ring 27 mentioned above constitute a partition member 20. Shown at numeral 28 is an annular member which is disposed in a manner to surround the outer periphery of the bottom coil 62, and the outside diameter of which is made slightly smaller than the inside diameter of a shroud 25. Numeral 29 indicates a filler, such as felt, which fills up the clearance between the stator coil end portion 6 and the annular member 28.

In this embodiment, a separately-installed fan (not shown) is disposed within a ventilating box 40 which is placed on the frame 1.

Cooling air enters the frame 1 from the ventilating box 40 through the action of the separately-installed fan. It cools the stator coil end portion 6 etc. while passing through an air intake passage 31 and an air exhaust passage 32 as indicated by arrows, whereupon it returns into the ventilating box 40 from the rear of a stator core 2. It is cooled by an air cooler, not shown, within the ventilating box, and enters the frame 1 again.

In this embodiment, there is a slight clearance between the shroud 25 and the annular member 28. The shroud 25 can therefore be detached, which is convenient for inspection etc.

In a case where the stator coil end portion 6 is held by a holding member for exclusive use, the partition member may be formed by filling up the interspaces between the coils with felt or the like after the impregnation of the coils and may thereafter be used without impregnation. In the device of FIG. 2, the axial fan may be replaced with a centrifugal fan.

As set forth above, according to this invention, the ventilation flue of a stator coil end portion is divided by a ventilation guide so that the tail end part of the stator coil end portion protruding beyond the ventilation guide may be cooled by centripetal cooling air and that the part of the stator coil end portion between a partition member and a stator core may be cooled by centrifugal cooling air. Therefore, the cooling effect of the stator coil end portion is enhanced conjointly with the fact that the speed of the centrifugal cooling air becomes higher than in the prior art.

What is claimed is:

1. In a cooling device for a rotary electric machine wherein a coil end portion of a stator of said rotary electric machine is provided with a ventilating guide which divides the stator coil end portion in the axial direction into a first ventilating section extending in the radial direction that causes cooling air to advance onto an inner peripheral side of the coil end portion and a second ventilating section extending in the radial direction that causes the cooling air, having passed through said first ventilating section, to advance onto an outer peripheral side of the coil end portion, and which guides the cooling air, having passed through said second ventilating section, into a space surrounding the stator, the improvement in said ventilation guide comprising a shroud covering the stator coil end portion from the outer peripheral side, and a partition member disposed on an inner peripheral side of said shroud and extending radially inwardly to divide a ventilation space into which said stator coil end portion extends into said first and second ventilation sections, said partition member being constructed of an electrically-insulating spacer ring of hardened, felt-like material interposed while pliable and hardened in position so as to extend in a circumferential direction between top coils and bottom coils of said stator coil end portion, and individual electrically-insulating spacers of hardened, felt-like material respectively interposed while pliable and hardened in position between the top coils and between the bottom coils in a manner to adjoin said spacer ring, said spacer ring and adjoining individual spacers closing up the interspaces between coils and forming said partition.

2. A cooling device for a rotary electric machine according to claim 1 wherein said partition includes an inner ring of hardened, felt-like material closing up the clearance between said top coils and said shroud and an inner ring adjoining said bottom coils and said spacers.

3. A cooling device for a rotary electric machine according to claim 1 wherein an interspace between said shroud and said partition member is substantially closed up with a filler which is made of a hardened, felt-like material.

4. A cooling device for a rotary electric machine according to claim 1 wherein said partition is located at the nose of said coil end portion.

* * * * *